(12) United States Patent
Xu et al.

(10) Patent No.: US 9,004,475 B2
(45) Date of Patent: Apr. 14, 2015

(54) CLAMPING MECHANISM WITH DETACHABLE POSITIONING MEMBER

(75) Inventors: Xiao-Bing Xu, Shenzhen (CN); Shan-Yan Xia, Shenzhen (CN); Zhi-Wen Wang, Shenzhen (CN); Qing-Song Wen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 867 days.

(21) Appl. No.: 13/225,678

(22) Filed: Sep. 6, 2011

(65) Prior Publication Data

US 2012/0242025 A1  Sep. 27, 2012

(30) Foreign Application Priority Data

Mar. 23, 2011  (CN) .......................... 2011 1 0069952

(51) Int. Cl.
  *B25B 1/20* (2006.01)
  *B25B 1/22* (2006.01)
  *B23Q 3/18* (2006.01)
  *B23Q 3/06* (2006.01)
  *B23Q 1/25* (2006.01)

(52) U.S. Cl.
  CPC ... *B23Q 3/06* (2013.01); *B23Q 1/25* (2013.01)

(58) Field of Classification Search
  CPC ........ B23Q 3/06; B23Q 1/25; B32B 2309/68; B32B 38/1833; B32B 2457/202; B25B 5/08; B25B 5/06
  USPC ......... 269/43, 45, 246, 71, 75, 76, 63, 61, 69, 269/67
  See application file for complete search history.

(56) References Cited

U.S. PATENT DOCUMENTS 7,003,827 B2 *  2/2006  DeMayo .................. 248/229.14
2011/0084435 A1 *  4/2011  Furlow .......................... 269/315

* cited by examiner

*Primary Examiner* — Lee D Wilson
*Assistant Examiner* — Seahee Yoon
(74) *Attorney, Agent, or Firm* — Novak Druce Connolly Bove + Quigg LLP

(57) ABSTRACT

A clamping mechanism includes a positioning member, a support plate, a frame, a fastening assembly, and an operating assembly. The support plate defines a through hole. The fastening assembly is fixed to the frame. The fastening assembly includes a fastening member and an elastic member. The positioning member extends through the through hole of the support plate, and is fastened by the fastening member under an elastic force of the elastic member. The operating assembly resists the fastening member, thereby driving the fastening member away from the positioning member.

13 Claims, 3 Drawing Sheets

CLAMPING MECHANISM WITH DETACHABLE POSITIONING MEMBER

BACKGROUND

1. Technical Field

The present disclosure generally relates to clamping mechanisms, and particularly, to a clamping mechanism having a detachable positioning member.

2. Description of the Related Art

A clamping mechanism is used for fixedly holding a workpiece in a machining process. The clamping mechanism includes a support plate, a fastening member, and a driving member. The support plate has a plurality of positioning pins, and the workpiece defines a plurality of positioning holes for receiving the positioning pins. In the machining process, the workpiece is positioned on the support plate, with the positioning pins engaging in the positioning holes of the workpiece. The fastening member is driven to move by the driving member, such that the workpiece is clamped between the fastening member and the support plate. However, the positioning pins cannot be fittingly engaged in the positioning holes by virtue of the machining precision of the positioning pins alone. As a result, the positioning pins easily scratches the workpiece during assembling of the workpiece to the support plate.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
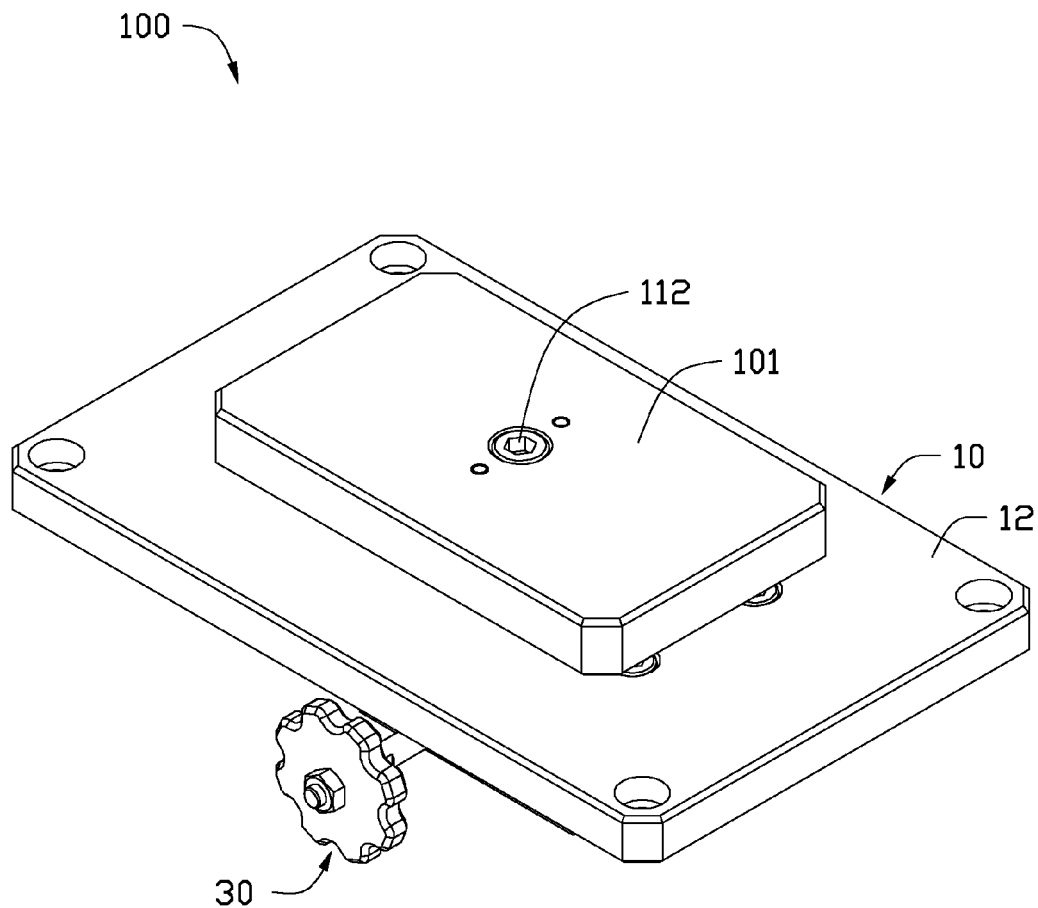
FIG. 1 is an isometric view of an embodiment of a clamping mechanism clamping a workpiece.
Figure 2:
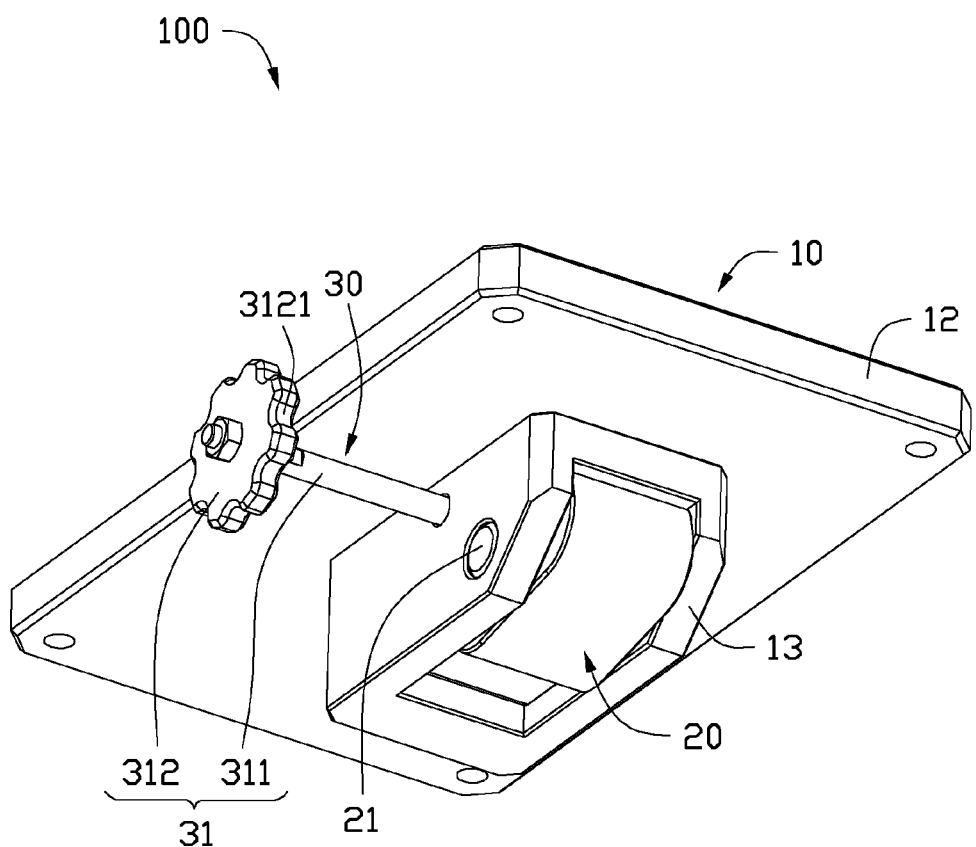
FIG. 2 is similar to FIG. 1, but viewed from another aspect.

Referring to the FIGS. 1 and 2, an embodiment of a clamping mechanism 100 includes a positioning assembly 10, a fastening assembly 20, and an operating assembly 30. The fastening assembly 20 and the operating assembly 30 are positioned on the positioning assembly 10.

Figure 3:
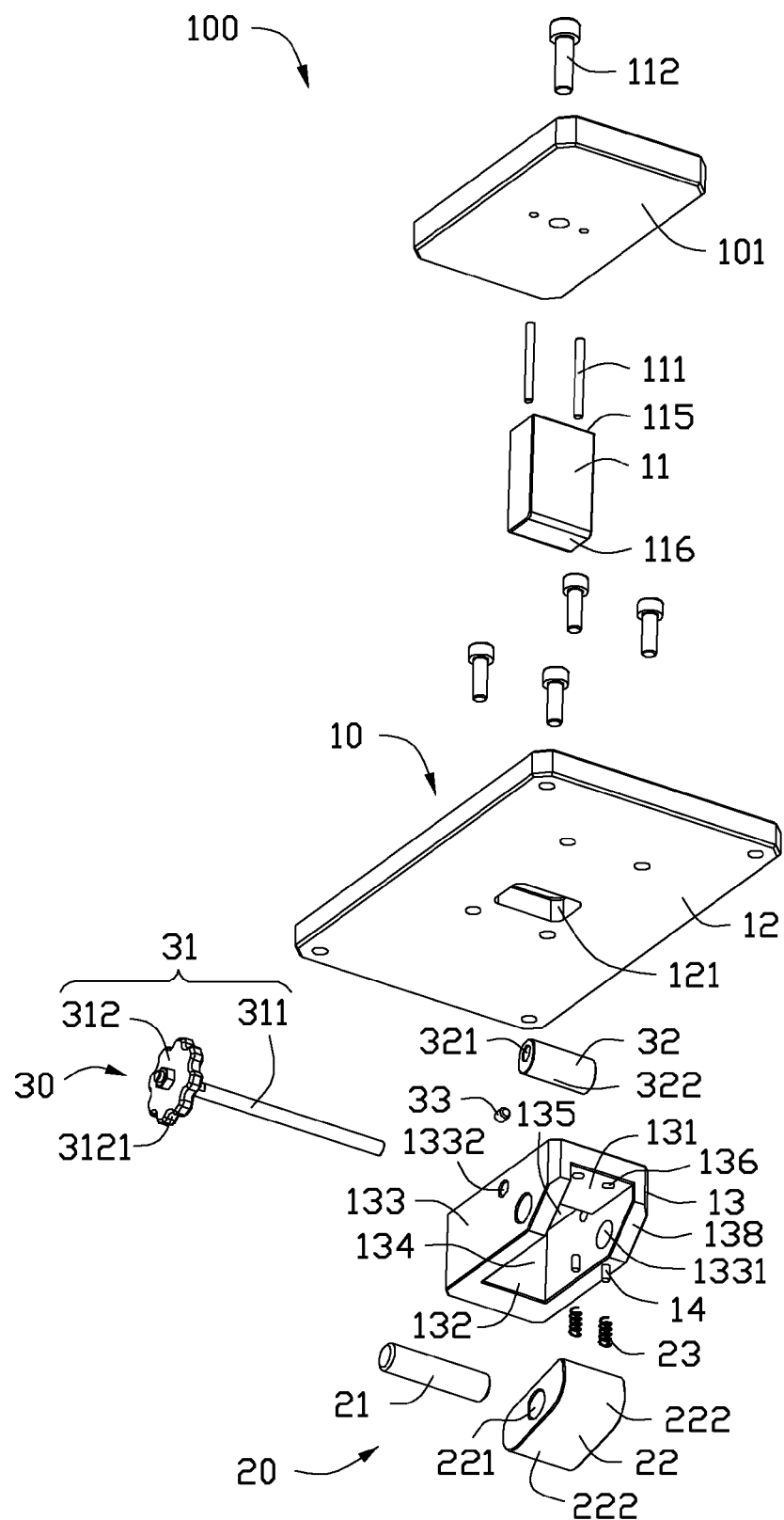
FIG. 3 is an exploded, isometric view of the clamping mechanism of FIG. 1.

Referring to the FIG. 3, the positioning assembly 10 includes a positioning member 11, a support plate 12, a frame 13, and two connecting members 14. The positioning member 11 is connected to a workpiece 101 via two pins 111. The frame 13 is fixed to the support plate 12, and the connecting members 14 are fixed to the frame 13. In the illustrated embodiment, the positioning member 11 is substantially rectangular. The positioning member 11 has a top end 115 and a bottom end 116 opposite to the top end 115. The top end 115 of the positioning member 11 is fixed to the workpiece 101 via a screw 112. The support plate 12 defines a through hole 121 for partially receiving the positioning member 11.

The frame 13 includes a bottom plate 131, a first side plate 132, and two second side plates 133. The first side plate 132 and the second side plates 133 extend from an edge of the bottom plate 131, and the first side plate 132 parallelly connects the second side plates 133. The bottom plate 131, the first side plate 132 and the second side plates 133 cooperatively define a receiving groove 134. The bottom plate 131 defines a positioning hole 135 adjacent to the first side plate 132, and two fixing holes 136 away from the first side plate 132.

Each second side plate 133 forms a wedge-shaped resisting portion 138 away from the first side plate 132, and defines a pivot hole 1331 adjacent to the resisting portion 138. Each second side plate 133 further defines an assembly hole 1332. In the illustrated embodiment, the connecting members 14 are a plurality of cylindrical pins. It should be understood that, the connecting members 14 may also be screws instead.

The fastening assembly 20 includes a pivot shaft 21, a fastening member 22, and two elastic members 23. The fastening member 22 defines a pivot hole 221 in a middle portion thereof for rotatably receiving the pivot shaft 21. The fastening member 22 forms two arc surfaces 222 on opposite ends thereof.

The elastic members 23 are positioned on the frame 13, and compressed between the bottom plate 131 and the fastening member 22. In the illustrated embodiment, the elastic members 23 are a plurality of compression springs.

The operating assembly 30 includes an operating pole 31, a resisting member 32 sleeved on the operating pole 31, and a pin 33 fixing the resisting member 32 to the operating pole 31.

The operating pole 31 includes a shaft portion 311 and an operating portion 312 extending from an end of the shaft portion 311. The operating portion 312 is circular, and defines a plurality of protrusions 3121 on an edge thereof.

The resisting member 32 has an elliptical cross-section taken along a direction perpendicular to an axis of the resisting member 32, and defines an assembly hole 321 for receiving the operating pole 31. The resisting member 32 forms two resisting portions 322 on opposite sides thereof. The resisting member 32 further defines a pin hole (not shown) in the side surface thereof for receiving the pin 33, thereby fixing the resisting member 32 and the operating pole 31 together.

Referring to the FIGS. 1 through 3, in assembly of the clamping mechanism 100, the frame 13 is fixed to the support plate 12 via the connecting members 14, with the positioning hole 135 aligned with the through hole 121. The resisting member 32 is positioned in the receiving groove 134 of the frame 13, and then the operating pole 31 extends through the assembly hole 1332 of one second side plate 133, the assembly hole 321 of the resisting member 32, and the assembly hole 1332 of the other second side plate 133. The pin 33 is pressed into the pin hole of the resisting member 32 to fix the resisting member 32 and the operating pole 31 together. The fastening member 22 is positioned in the receiving groove 134 of the frame 13, and then the pivot shaft 21 extends through the pivot hole 1331 of one second side plate 133, the pivot hole 221 of the fastening member 22, and the pivot hole 1331 of the other second side plate 133. The elastic members 23 are positioned between the bottom plate 131 of the frame 13 and the fastening member 22. The bottom end 116 of the positioning member 11 extends through the through hole 121 of the support plate 12 and the positioning hole 135 of the frame 13, and resists the fastening member 22.

In use, the workpiece 101 is fixed to the top end 115 of the positioning member 11, and is pressed to attach to the support plate 12. Then, the positioning member 11 is driven to move by the support plate 12, and the bottom end 116 pushes the fastening member 22 to rotate about the pivot shaft 21. The elastic members 23 are compressed due to the rotation of the fastening member 22. Therefore, an elastic force is generated by the elastic members 23 to make the arc surface 222 of the fastening member 22 to tightly resist the positioning member 11. As a result, the positioning member 11 is grasped by the fastening member 22 and the frame 13, and the workpiece 101 is positioned on the clamping mechanism 100 and machined by other machining device (not shown).

When the workpiece 101 has been machined, the operating pole 31 can be rotated, thereby rotating the resisting member 32. As a result, an end of the fastening member 22, which resists the positioning member 11, is disengaged from the positioning member 11 by virtue of a driving force of the resisting member 32. Then, the workpiece 101 together with the positioning member 11 can be taken from the clamping mechanism 100. Finally, the workpiece 101 is detached from the positioning member 11.

Because the workpiece 101 is first fixed to the positioning member 11, and the positioning member 11 is grasped in the frame 13 by the fastening member 22 to position the workpiece 101 on the support plate 12. Therefore, the workpiece 101 is not directly clamped by the frame 13 and the fastening member 22, and thereby will not be scratched by the frame 13 and the fastening member 22.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A clamping mechanism, comprising:
   a positioning member;
   a support plate defining a through hole;
   a frame fixed on the support plate and defining a positioning hole;
   a fastening assembly comprising:
      a fastening member rotatably positioned on the frame, and
      an elastic member compressed between the frame and the fastening member, wherein the positioning member extends through the through hole of the support plate and the positioning hole to resist the fastening member, and is configured to push the fastening member and being fastened by the fastening member under an elastic force of the elastic member; and
      an operating assembly resisting the fastening member and configured to push the fastening member, and being capable of driving the fastening member away from the positioning member to release the positioning member.

2. The clamping mechanism of claim 1, wherein the frame is fixed to the support plate, and the fastening assembly and the positioning member are positioned on the frame.

3. The clamping mechanism of claim 2, wherein the frame comprises a bottom plate and two side plates extending from an edge of the bottom plate in parallel, each side plate defines a pivot hole, the fastening assembly comprises a pivot shaft extending through the pivot holes of the side plates, and the fastening member is sleeved on the pivot shaft.

4. The clamping mechanism of claim 3, wherein the elastic member is compressed between the bottom plate and the fastening member.

5. The clamping mechanism of claim 3, wherein each side plate defines an assembly hole, and the operating assembly comprises an operating pole extending through the assembly holes of the side plates.

6. The clamping mechanism of claim 5, wherein the operating assembly further comprises a resisting member sleeved on the operating pole, and a pin fixing the resisting member to the operating pole.

7. The clamping mechanism of claim 6, wherein the resisting member has an elliptical cross-section perpendicular to an axis of the resisting member.

8. The clamping mechanism of claim 5, wherein the operating pole comprises a shaft portion and an operating portion extending from an end of the shaft portion.

9. A clamping mechanism, comprising:
   a positioning member;
   a support plate defining a through hole;
   a frame fixed to the support plate and defining a receiving groove, wherein the frame comprises a bottom plate and two side plates extending from an edge of the bottom plate in parallel, each side plate defining a pivot hole and an assembly hole;
   a fastening assembly rotatably received in the receiving groove of the frame, wherein the fastening assembly comprises a fastening member sleeved on the pivot shaft, a pivot shaft extending through the pivot holes of the side plates, and an elastic member compressed between the bottom plate and the fastening member, the positioning member extends through the through hole of the support plate, and is clamped between the fastening member and the frame under an elastic force of the elastic member; and
   an operating assembly resisting the fastening member and configured to push the fastening member, thereby driving the fastening member away from the positioning member, wherein the operating assembly comprises an operating pole extending through the assembly holes of the side plates, a resisting member sleeved on the operating pole, and a pin fixing the resisting member to the operating pole.

10. The clamping mechanism of claim 9, wherein the elastic member is compressed between the bottom plate and the fastening member.

11. The clamping mechanism of claim 9, wherein the resisting member has an elliptical cross-section perpendicular to an axis of the resisting member.

12. The clamping mechanism of claim 9, wherein the operating pole comprises a shaft portion and an operating portion extending from an end of the shaft portion.

13. A clamping mechanism, comprising:
   a positioning member;
   a support plate defining a through hole;
   a frame fixed to the support plate, wherein the frame comprises a bottom plate and two side plates extending from an edge of the bottom plate in parallel, each side plate defining a pivot hole and an assembly hole;
   a fastening assembly, the fastening assembly fixed to the frame, wherein the fastening assembly comprises a pivot shaft extending through the pivot holes of the side plates, a fastening member sleeved on the pivot shaft, and an elastic member, the positioning member extends through the through hole of the support plate, and fastened by the fastening member under an elastic force of the elastic member; and
   an operating assembly resisting the fastening member and configured to push the fastening member, thereby driving the fastening member away from the positioning member, wherein the operating assembly comprises an operating pole extending through the assembly holes of the side plates, a resisting member sleeved on the operating pole, and a pin fixing the resisting member to the operating pole.

* * * * *